March 7, 1939.  J. L. FINCH  2,149,729
AUTOMATIC TEMPERATURE CONTROL
Filed Dec. 13, 1934   3 Sheets-Sheet 1
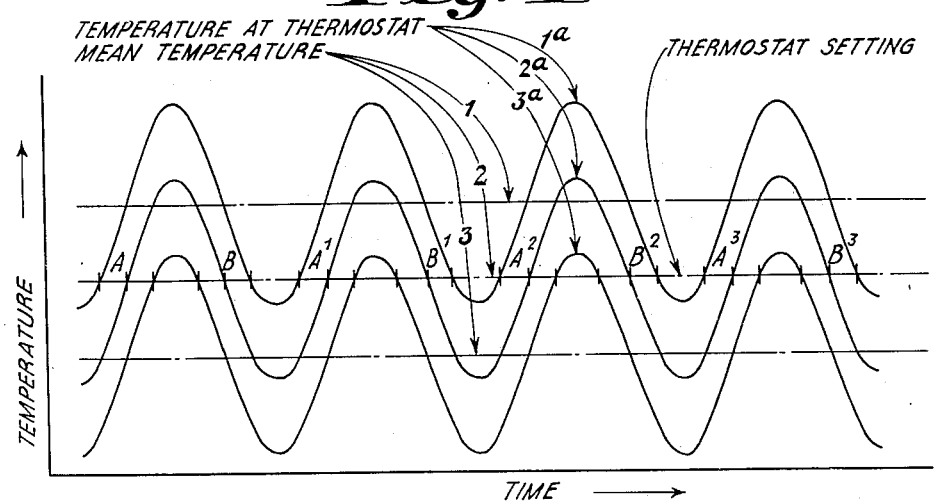
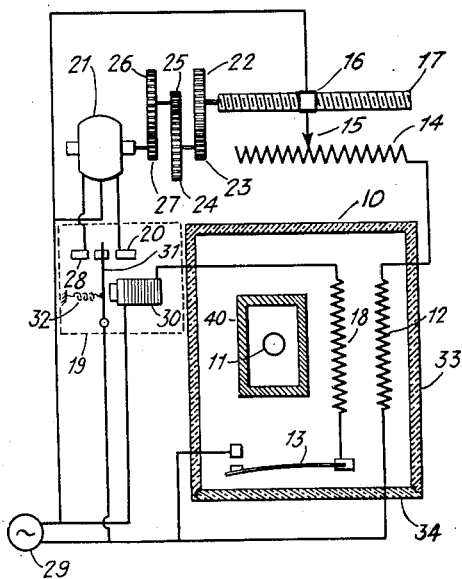
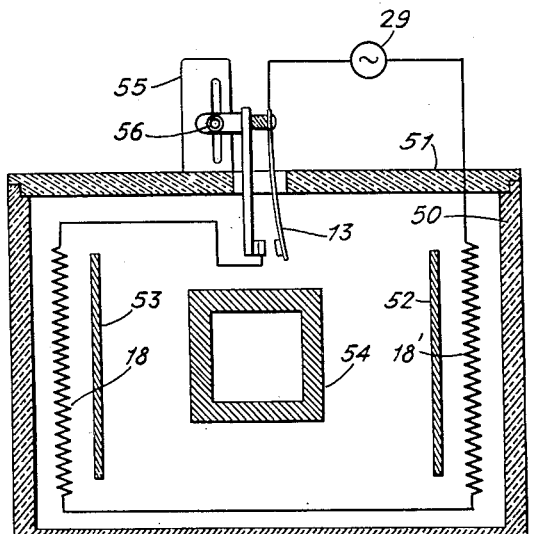
INVENTOR
J. L. FINCH
BY H.S. Grover
ATTORNEY March 7, 1939.   J. L. FINCH   2,149,729
AUTOMATIC TEMPERATURE CONTROL
Filed Dec. 13, 1934   3 Sheets-Sheet 2

INVENTOR
J. L. FINCH
BY *H. S. Grover*
ATTORNEY

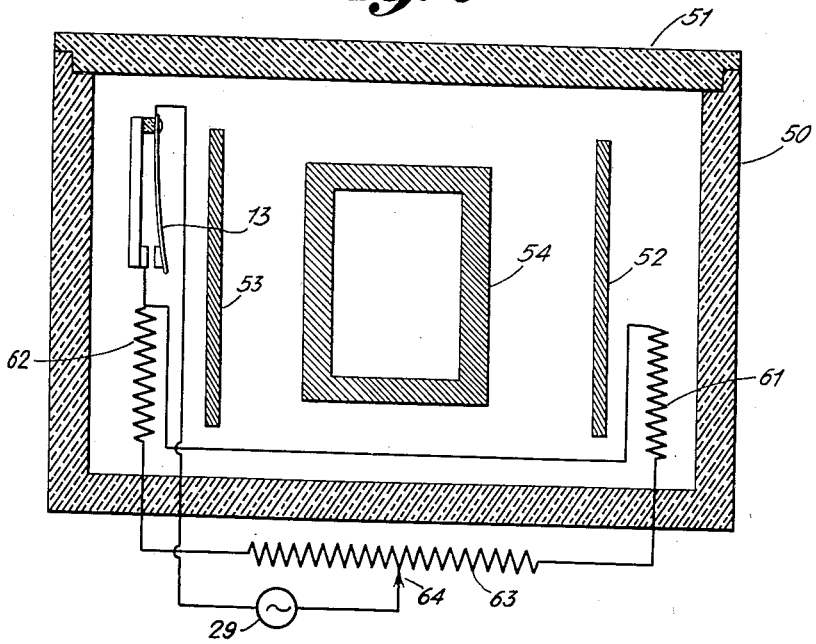
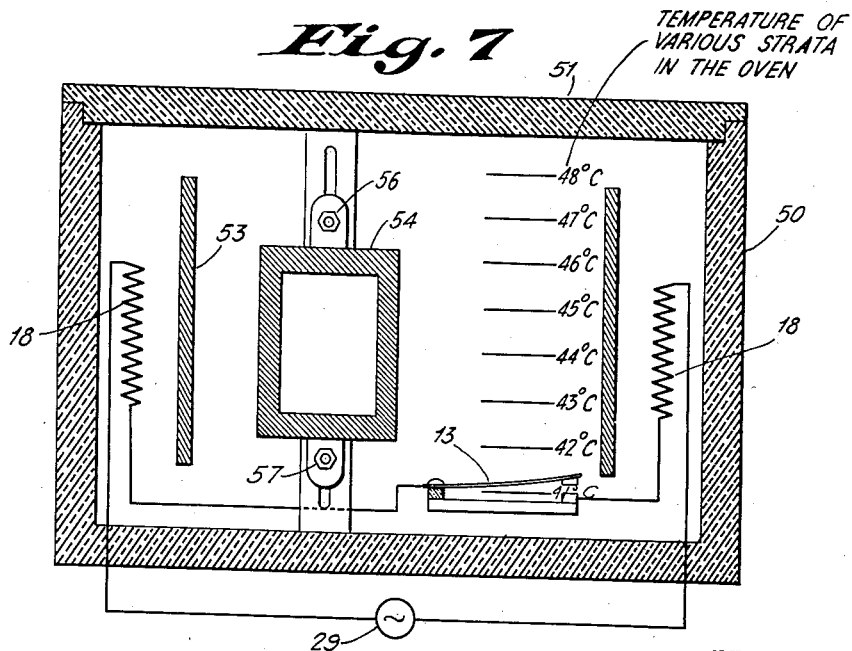

Patented Mar. 7, 1939

2,149,729

UNITED STATES PATENT OFFICE 2,149,729

AUTOMATIC TEMPERATURE CONTROL

James L. Finch, Patchogue, N. Y., assignor to Radio Corporation of America, a corporation of Delaware Application December 13, 1934, Serial No. 757,326

4 Claims. (Cl. 219—20)

This invention relates to improvements in automatic temperature control apparatus, and more particularly to the automatic temperature control of an oven or casing enclosing a piezo-electric crystal.

An object of this invention is to simplify and improve the controlling of the temperature of a container for piezo-electric crystals for use in commercial short-wave circuits.

Another object of this invention is to provide a novel method of heating the piezo-electric crystal of an oven or its enclosing chamber by means of electrical heating units which are externally controlled so that the heater is on a portion of the time and off a portion of the time.

Another object of this invention is to provide an automatic temperature control device wherein the elements employed for the temperature control of the heat within the oven are arranged to be controlled extremely accurately.

A feature of this invention is the means for adjustment of the oven temperature control so as to compensate for any effects encountered due to a particular set-up of an oven manufactured for the average temperature conditions.

Another feature of this invention is the location of a thermostatic element nearest the warmest stratum in the oven and the provision for exposing a part of it or all of it to a partial degree to the ambient temperature, this exposure being adjusted manually.

Another feature of this invention is the mounting of the thermostatic element so that its position can be manually adjusted to expose it to any desired stratum within the casing.

This invention is particularly adapted to the automatic temperature control of an oven which is employed for various scientific and engineering purposes, wherein it is desirable to hold the temperature of a certain body accurately. The temperature to be controlled may be either above or below the ambient temperature. When the temperature desired is to be held above the ambient temperature, heat is supplied to the oven, while on the other hand, when it is desired that the temperature to be controlled is to be kept below the ambient temperature, then heat must be carried away from the interior of the oven. In this latter case some cold fluid is required to carry away the heat within the oven. The modification covered by my invention as disclosed in the following description, is particularly adapted to the case where the temperature required is to be maintained above the ambient temperature, but it is to be distinctly understood that this description with obvious modifications would apply equally well for the case where heat is to be extracted from the interior of the oven.

The source of heat which I prefer to employ is that of an electrical source which may be of any suitable form such as an alternating current supply source or a direct current source. The electrical source is then connected through various controlled elements to two or more heating units contained within the casing which may be of any suitable form such as a heating element made up of a winding of resistance wire or the like. In the temperature controlled oven the heat generated within is transferred from the point of generation to the walls of the oven to supply the heat losses. This heat is transferred by conduction or convection. Some heat may also be transferred by radiation but this latter factor is usually negligible. The medium within the oven may be a solid or fluid and when fluid it may be circulated by natural or artificial means. The principle outlined in the following applies in all these cases. The temperature control is effected by means of a thermostatic unit placed within the oven and adjacent to the body to be controlled. This thermostatic unit may control all of the heat by turning it completely on when the temperature is below the setting of the thermostatic unit and completely shutting off the heating element when it is above the thermostatic setting, or a part of the heat may be supplied with such thermostat control and the remainder with manual control arrangements only. The body or piezo-electric crystal whose surrounding temperature is to be regulated, may have sufficient heat storage to smooth out the variations to a negligible value, or it may be installed within a shield or oven to assist in the smoothing out. The body or piezo-electric crystal itself would then hold a temperature equal to the average temperature to which it is subjected.

The specific features of this invention will probably best be understood by referring to the accompanying drawings, in which, Fig. 1 is a graphic representation of the various temperature curves.

Fig. 2 is a diagrammatic arrangement of the apparatus and circuit employed in my invention.

Fig. 3 is a casing having baffles, to improve the fluid circulation, and having an external thermostatic element which can be manually adjusted.

Fig. 6 is another modification similar to Figs. 3 and 4 except that the heating elements are divided into two portions.

Fig. 7 is a modification similar to Fig. 6, except that the oven is arranged within the casing so as to be manually adjustable.

Figure 4:
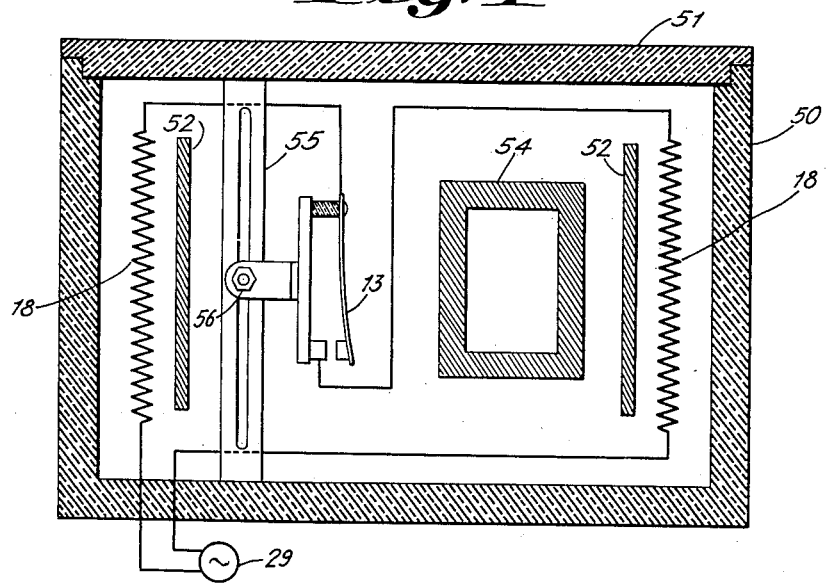
Fig. 4 is a casing similar to Fig. 3 except that the thermostatic element is internally located.

Referring now to Fig. 1, the three parallel horizontal lines 1, 2, and 3 represent the mean temperatures wherein the center line 2 represents the thermostatic setting and is plotted against time. When the heat generated within the oven is set at a particular value for a given ambient temperature, sufficient that the controlled heat is on just half the time and off half the time, then the average temperature will equal the temperature at which the thermostat is set as is represented by curve $2^a$. The points A, $A^1$, $A^2$ indicate when the thermostat turns the heat off and points B, $B^1$, and $B^2$ indicate when the thermostat turns the heat on. In curve $2^a$ the time AB is equal to time $BA^1$ and time $B^1A^2$, etc.

Curves $1^a$ and $3^a$ also show the condition with the thermostat set such as in 2 but with the same relation between the heat generated and the ambient temperature that in the case of curve $1^a$ the heat is on a relatively small part of the time and in the curve $3^a$ it is on a relatively large part of the time. The cyclic changes shown in these curves are due to the over-travel which is due to a lag in the heat transfer caused by the limited conductivity and the heat storage capacity of the elements. It will be noted that for the same thermostat setting the mean temperature is higher for curve $1^a$ than for curve $2^a$ and lower for curve $3^a$ than for curve $2^a$. Curve $1^a$ represents the condition when the ambient temperature is high and curve $3^a$ represents the condition when it is low. Thus, it will be seen that the mean temperature rises and falls with the ambient temperature. This effect is made minimum by cutting down the heat lag as much as possible. It will be seen from a careful study of the curves that if the heat could be generated at all points on the surface of the oven in proportion to that required to make up the heat losses from these points, the inside temperature would be uniform throughout. However, it is impractical to accomplish this and therefore some points inside the oven are hotter than others in order that the heat may be transferred from the points of excessive heat to the points where the heat is not sufficient. Thus, there are strata within the casing or enclosing chamber of different temperature levels. The thermostat will assume a temperature equal to that of the stratum in which it is located. Then the temperature of this stratum will follow the curves shown in Fig. 1. When the ambient temperature drops then more heat is required to maintain the oven temperature. Therefore, there will be more difference in the temperature within the casing or container. Thus, all points which are warmer than the stratum to which the thermostat responds will rise in temperature, while those which are cooler will fall in temperature. If the piezoelectric crystal or body whose temperature is to be controlled is exposed to a stratum whose mean temperature is cooler than the thermostat, then its temperature drops with the ambient temperature. However, if the body is warmer, then its temperature rises when the ambient temperature falls. Thus it is apparent that if the body to be regulated is placed in contact with a stratum sufficiently warmer than the thermostat, its temperature variation with the ambient temperature can be made to just compensate for the effects of a time lag in the heat transfer shown in Fig. 1.

Referring now to the apparatus arrangement shown in Fig. 2 wherein one phase or modification of my invention is illustrated and relates to the control of the percent of time that the heat is on and that it is off, this is accomplished by means of an automatic adjustment either of the amount of heat controlled by the thermostat or the amount of heat which is on steady and not controlled by the thermostat. This arrangement is so adjusted that the heat is on half the time and off half the time. A simple casing or chamber 10 has contained therein an oven 40 for enclosing a piezo-electric crystal 11, two electrical heater units 12 and 18, and a thermostat 13. The primary heater unit 12 which furnishes a steady heat is not controlled by thermostatic unit 13 but is controlled by setting of the variable resistance 14 which has a variable contacting element or slider 15, the movement of which is controlled by the nut 16 cooperating with the threaded worm gear 17. The thermostat 13 which is located within the casing controls the current and therefore the heat in the secondary heater 18. This current also actuates a relay 19 which is located outside of the casing 10. When this current is on, relay 19 closes a right hand contact 20 which drives the motor 21 in a particular direction. The motor 21 is adapted to move the slider 15 of the resistance 14 by means of the threaded worm gear or screw 17 and train of gears comprising gears 22, 23, 24, 25, 26, and 27 so as to increase the heat which is liberated by the primary heater 12. When the thermostat 13 is open the relay 19 closes the left hand contact 28, and the motor 21 then turns in the opposite direction tending to decrease the heat in the primary heater 12. The speed of the motor and the arrangement of the ratio of the train of gears is such that the sliding action of the slider 15 will be relatively slow. When the heat supplied in the casing 10 is such that the thermostat is on exactly half the time, then the travel of the slider is negligible. When conditions are such that the thermostat 13 is on more than half the time, then the average travel of the slider is such as to decrease the heat in the primary heater 12 and therefore requires that the thermostat be on a lower percent of the time to correct the condition initially assumed. In this way the thermostat keeps the heat supplied by the secondary heater 18 on half the time and off half the time.

The source of electric current is supplied from any suitable source such as an alternating current generator 29 and is arranged in a circuit in such a manner that it is always capable of supplying heat directly to the primary heater 12. The motor 21 is connected in series between the source of current 29 and the relay 19. The secondary heater 18 is connected in series from the current source with the thermostat 13 and a winding 30 of the relay 19 which when energized draws the armature 31 in a position so as to make contact with the right hand contact 20 and rotate the motor 21 in a particular direction. When the relay winding 30 is not energized then the spring 32 draws the armature 31 to a position so as to make contact with the left hand contact 28, thus driving it in an opposite direction.

The walls of the casing 10 are insulated from the ambient temperature by any suitable insulating material as is indicated by 33, and means not shown, such as a suitable adjustable shelf arrangement whereby by opening the door 34 the body 11 and the heating elements 12 and 18 are moved to different levels within the casing 10 so as to expose the body of the piezo-electric crystal 11 to any desired heat stratum within the casing.

My invention also provides a means for accomplishing the above relationship and also for the adjustment of this relationship to take into account variations which may be caused by placing the oven in different locations and subjecting it to different conditions. This is accomplished by one or any combinations of the following:

First, by locating the thermostat near the warmest stratum in the oven and making provision for exposing a part of it or all of it to a partial degree to the ambient temperature, such exposure being manually adjustable, as is illustrated by Fig. 3 wherein 50 is a casing made of insulating material with a cover or door 51. 52 and 53 are baffles conveniently located within the casing to improve the circulation of the fluid within the casing. 54 represents the crystal oven or any conducting member enclosing the crystal when this temperature control device is to be used for temperature control of a crystal. A heating element 18 and 18' is divided into two parts, each of the parts being located on each side of the casing as shown. Heating current is supplied by a suitable generator 29, the current of which is interrupted by the bimetallic thermostat unit 13. This thermostat is exposed partly to air in the top of the casing and partly to air within the casing. Its relative exposure to these two atmospheres can be adjusted by loosening the screw 56 from the guide 55 and then moving the thermostat unit in or out. Thus a position can be found wherein the temperature of element 54 remains constant regardless of the variations in the ambient temperature.

Second, mounting the thermostat so its position can be manually adjusted to expose it to any desired stratum within the oven, as is illustrated by Fig. 4, which shows a modification similar to that of Fig. 3, except that the thermostat unit 13 is arranged within the casing and is adjustable in position to expose it to various temperature strata within the casing, and as mentioned above, a particular location of the thermostat unit can be found at which the temperature of the oven 54 will remain substantially constant despite variations in the ambient temperature.

Figure 5:
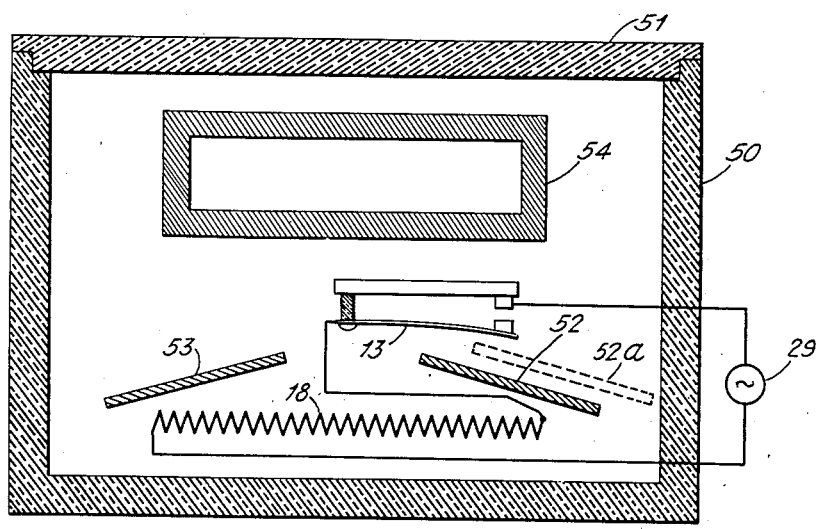
Fig. 5 is another modification similar to Figs. 3 and 4 except that the baffles are shown in a different location and are arranged to be adjusted.

Third, mounting of the thermostat element with adjustable baffles, fins or heat conducting elements which are arranged to give the effect of exposing the thermostat to any desired stratum within the casing. Fig. 5 illustrates a particular modification mentioned above, wherein the baffles are arranged so that part of the thermostat unit 13 is subjected to the temperature of the air rising from the heater element, while the remainder of the thermostat unit is subjected to the temperature of the air returning to be reheated. A baffle 52 is shown located in the desired position. A baffle 52a may be located in any intermediate position. The movement of this baffle subjects a greater or smaller portion of the thermostat unit to the heated air. A position of baffle 52a can be found which will maintain the oven 54 at a constant temperature despite ambient temperature variations.

Fourth, a provision is made for adjusting the distribution of the generated heat controlled by the thermostat to change the heat stratum within the casing, thus causing the thermostat to be in any desired stratum. For example, this may be accomplished by locating two sets of heater wires in different parts of the box to be controlled by the thermostat but so arranged that the relative heat in the two heating elements can be varied. Fig. 6 shows such a modification as is mentioned above and is similar to the modification shown in Figs. 3 and 4, except that the heating elements are divided into two portions 61 and 62. The relative heat in these two portions is controlled by the position of a slider 64 on the potentiometer 63. The thermostat unit 13 is located so as to be exposed to the heated air rising from the heater 62. If all the heat were generated in heater 62 and none in heater 61, then the temperature would be in the hottest part of the casing and the temperature of oven 54 would vary in direct proportion to the ambient temperature variation. If all of the heat were concentrated in heater 61, the thermostat unit would be in the coldest portion of the casing and the temperature of oven 54 would vary inversely with the ambient temperature. A particular adjustment of slider 64 can be found at which the temperature of oven 54 remains constant regardless of the ambient temperature.

Fifth, by providing a means for moving the body whose temperature is to be regulated to various strata within the oven so that one may be chosen which under the particular set-up condition is maintained at a substantially constant temperature.

Fig. 7 illustrates a means for moving the body whose temperature is to be regulated to various strata within the oven and is provided with means for securing the oven 54 when the desired position is secured. A point can be found within the casing where the temperature of the oven 54 remains constant despite variations in ambient temperature. This figure also illustrates by arrows the air currents which are sent up, and likewise indicates the temperature of the various strata in the oven under a particular set of conditions. If the ambient temperature were such that the thermostat unit 13 kept the heat on half the time and off half the time, then the average temperature of the thermostat unit would be between 41° and 42° while the average temperature to which the oven 54 is exposed would be between 44° and 45°. If the ambient temperature should fall, the thermostat would keep the heat on a larger percentage of the time and the temperature at the thermostat unit 13 would rise. However, the cooling would be such that the point at which oven 54 is located would exceed that of the thermostat unit 13 by a less amount, and therefore its average temperature would remain the same as previously.

While this invention has been described and illustrated showing certain modifications, it is to be distinctly understood, however, that this invention is not to be limited except by those limitations clearly imposed in the appended claims.

Cross reference is hereby made to applicant's Patent No. 2,095,383, which is a division of this application.

I claim:

1. An automatic temperature control device comprising a casing, an oven within said casing, means for maintaining constant temperature within said oven, said means comprising two separate heating elements, each one of which is located at a different position inside of said casing, a thermostat having electrical contacts located within said casing and adjacent one of said heating elements, two separate heat baffles each being located intermediate one of said heating elements and a side of said oven, and a potentiometer having each end connected to an end of each separate heating element, the remaining ends of each one of the two separate heating elements being connected together and also being connected through the contacts on said thermostat to one side of an electrical supply source, the movable contact of said potentiometer being connected to the other side of said supply source for controlling the heat within said oven from said electrical supply source.

2. An automatic temperature control device comprising a casing, an oven centrally located within said casing, means for maintaining constant temperature within said oven, said means comprising two separate heating elements each one of which is located at a different position inside of said casing, a thermostat having electrical contacts located within said casing and adjacent one of said heating elements, two separate heat baffles each being located intermediate one of said heating elements and a side of said oven, and a potentiometer having each end connected to an end of each separate heating element, the remaining ends of each one of the two separate heating elements being connected together and also being connected through the contacts on said thermostat to one side of an electrical supply source, the movable contact of said potentiometer being connected to the other side of said supply source for controlling the heat within said oven from said electrical supply source.

3. An automatic temperature control device comprising a casing, an oven within said casing, means for maintaining constant temperature within said oven, said means comprising two separate heating elements, each one of which is located close to opposite sides inside of said casing, a thermostat having electrical contacts located within said casing and adjacent one of said heating elements, two separate heat baffles each being located intermediate one of said heating elements and a side of said oven, and a potentiometer having each end connected to an end of each separate heating element, the remaining ends of each one of the two separate heating elements being connected together and also being connected through the contacts on said thermostat to one side of an electrical supply source, the movable contact of said potentiometer being connected to the other side of said supply source for controlling the heat within said oven from said electrical supply source.

4. An automatic temperature control device comprising a casing, an oven within said casing, means for maintaining constant temperature within said oven, said means comprising two separate heating elements, each one of which is located at a different position inside of said casing, a thermostat having electrical contacts located within said casing, two separate heat baffles each being located intermediate one of said heating elements and a side of said oven, and a potentiometer having each end connected to an end of each separate heating element, the remaining ends of each one of the two separate heating elements being connected together and also being connected through the contacts on said thermostat to one side of an electrical supply source, the movable contact of said potentiometer being connected to the other side of said supply source for controlling the heat within said oven from said electrical supply source.

JAMES L. FINCH.